(12) United States Patent
Leary

(10) Patent No.: US 12,546,703 B2
(45) Date of Patent: Feb. 10, 2026

(54) PAEDIATRIC CUVETTE

(71) Applicant: INTERSURGICAL AG, Vaduz (LI)

(72) Inventor: Matthew James William Leary, Wokingham (GB)

(73) Assignee: INTERSURGICAL AG, Vaduz (LI)

( * ) Notice: Subject to any disclaimer, the term of this patent is extended or adjusted under 35 U.S.C. 154(b) by 216 days.

(21) Appl. No.: 18/120,964

(22) Filed: Mar. 13, 2023

(65) Prior Publication Data

US 2024/0310273 A1    Sep. 19, 2024

(51) Int. Cl.
*G01N 21/03*    (2006.01)

(52) U.S. Cl.
CPC . *G01N 21/0303* (2013.01); *G01N 2021/0307* (2013.01)

(58) Field of Classification Search
CPC ........... G01N 21/0303; G01N 21/3504; G01N 2021/0307
See application file for complete search history.

(56) References Cited

U.S. PATENT DOCUMENTS

| | | | | |
|---|---|---|---|---|
| 4,227,814 A * | 10/1980 | Soodak | ................ | B04B 5/0442 356/414 |
| 4,658,244 A * | 4/1987 | Meijer | ................ | A61M 5/365 128/DIG. 13 |
| 5,437,841 A * | 8/1995 | Balmer | ................ | G01N 21/03 422/549 |
| 6,512,581 B1 * | 1/2003 | Yamamori | ............ | A61B 5/097 356/246 |
| 6,926,005 B1 | 8/2005 | Colman et al. | | |
| D621,520 S | 8/2010 | Talmer et al. | | |
| D698,036 S | 1/2014 | Dickinson | | |
| D737,451 S | 8/2015 | Pokorny et al. | | |
| D808,036 S | 1/2018 | Langhoff et al. | | |
| D839,448 S | 1/2019 | Langhoff et al. | | |
| D877,356 S | 3/2020 | Clive-Smith et al. | | |
| D927,014 S | 8/2021 | Turner | | |
| 11,199,490 B2 * | 12/2021 | Coombs | ................ | G01N 21/17 |
| 2004/0069307 A1 | 4/2004 | Rich et al. | | |

(Continued)

FOREIGN PATENT DOCUMENTS

DE    2923301 A1    12/1980
EP    2407103 A1    1/2012

OTHER PUBLICATIONS

Search Report for GB2201827.9, dated Jul. 21, 2022.

(Continued)

*Primary Examiner* — Sang H Nguyen
(74) *Attorney, Agent, or Firm* — Troutman Pepper Locke LLP (Rochester)

(57) ABSTRACT

A gas sampling assembly comprising an insert and a cuvette, and an insert for use in a cuvette, suitable for sampling respiratory gases of paediatric patients, the insert comprising a unitary insert having a hub and at least two extending members extending outwardly from the hub, the at least two extending members defining a void therebetween and the insert being located, in use, at least partially within the sampling channel, and the gas sampling cell assembly being configured such that light passing through the optical window passes into the sampling channel and through the void between the two extending members.

18 Claims, 2 Drawing Sheets

(56) References Cited

U.S. PATENT DOCUMENTS

| | | | |
|---|---|---|---|
| 2006/0073603 A1* | 4/2006 | Jaunakais | G01N 31/224 |
| | | | 436/169 |
| 2007/0019189 A1* | 1/2007 | Marsteller | B01L 3/50825 |
| | | | 356/440 |
| 2008/0127977 A1* | 6/2008 | Orr | A61M 16/0858 |
| | | | 128/204.22 |
| 2010/0238436 A1 | 9/2010 | Harvard | |
| 2011/0164245 A1* | 7/2011 | Eikelmann | B01L 3/5088 |
| | | | 356/246 |
| 2012/0013121 A1 | 1/2012 | Weckstrom | |
| 2012/0120397 A1* | 5/2012 | Furtaw | G01N 21/3504 |
| | | | 356/246 |
| 2015/0198521 A1 | 7/2015 | Moldt et al. | |
| 2016/0231227 A1* | 8/2016 | Sternick | G01N 21/0303 |
| 2017/0102322 A1 | 4/2017 | Goldring et al. | |
| 2020/0222900 A1 | 7/2020 | Merchez | |

OTHER PUBLICATIONS

Drager Medical GmbH, Instruction Manual for Oxylog 3000 Plus, pp. 1, 48, 167, 168, 172 (2012).

Image of "Disposable CO2 Cuvette—Adults" Order No. MP01062 (downloaded Jun. 16, 2020).

Image of "Disposable CO2 Cuvette—paed." Order No. MP01063 (downloaded Jun. 16, 2020).

CO2 Cuvette for Drager@ventilators. Online, published date unknown. Retrieved on Oct. 19, 2020.

\* cited by examiner

PAEDIATRIC CUVETTE

BACKGROUND OF THE DISCLOSURE

The present invention relates to a medical device for measuring the concentration of a specific component of exhaled air. In particular, the present invention relates to a medical device for measuring the concentration of carbon dioxide ($CO_2$) in the exhaled air of paediatric patients.

The concentration of $CO_2$ in exhaled air provides information on the efficacy of ventilation, gas exchange and metabolism. Continuous monitoring of the $CO_2$ concentration in exhaled air can additionally serve as an early warning of deterioration in a patient's condition, particularly for critically ill patients. The ability to accurately measure the concentration of $CO_2$ in exhaled air is therefore an important part of patient monitoring.

Typically, the concentration of $CO_2$ in exhaled gas is measured non-invasively with an optical sensor. Exhaled air passes through a gas sampling cell, or cuvette, located in the expiratory limb of the respiratory circuit and normally positioned between the patient interface and the artificial respirator/ventilator. The cuvette contains an optical window. A beam of infrared light passes through the optical window, through a gas sampling channel within cuvette (and thus through the gas sample), and through a second optical window before being detected by a receiver. $CO_2$ absorbs light at a specific wavelength in the infrared spectrum, and the level of absorption of infrared light detected enables the concentration of $CO_2$ to be inferred.

The determination of $CO_2$ levels in paediatric patients carries particular challenges, above those faced in the measurement of $CO_2$ levels in adult patients. Most notably, paediatric patients typically have a lower tidal volume, which can result in insufficient air flow passing through the cuvette to permit accurate measurement. However, a cuvette correctly sized for a paediatric patient may not be sized correctly to connect to a standard respiratory circuit. This problem has been solved in the past by retaining the outer dimensions of the cuvette (to permit connection to a respiratory circuit) but reducing the internal volume. In the $CO_2$ paediatric cuvette produced by Draeger Inc., the outer dimensions of the cuvette remain the same as those of a cuvette used for adult patients while a portion of the internal space is partitioned off to create voids, reducing the usable internal volume and so reducing the volume of gas which can pass through the cuvette, thereby making it suitable for use with the lower tidal volume of paediatric patients.

In an alternative approach, U.S. Pat. No. 6,512,581 describes the use of an insert placed inside a cuvette to reduce the internal volume and enable efficient measuring of $CO_2$ in the exhaled gas of neonatal and paediatric patients. The insert comprises a body having one or more slits which form a gas pathway and which lie in the same plane as the optical windows of the airway adaptor, so that the light which passes through the optical window also passes through the slits. The insert is provided in two sections, which are inserted into the airway adaptor from either end and clip together in the middle.

DE2923301 also considers the problem of reducing the internal volume of a cuvette to make it suitable for paediatric use, and demonstrates how an insert made of temperature resistant plastic may be used for this purpose. The insert comprises a tube with a tapered bore and a through window which lines up with the optical windows in the cuvette, a cap at one end fitting around the outside of the cuvette to hold the insert in place.

In small medical devices such as cuvettes which are sold in large volume and for low cost, and on which the profit margin for the manufacturer is low, ease and cost of manufacture are key considerations in the development of a commercially viable product. A reduction in the amount of material required, in the number of component parts and/or in the number of steps involved in manufacture all reduce the cost of manufacture. It is equally important that the quality and effectiveness of the device are maintained, and features which are easier to manufacture whilst maintaining or improving the quality of the final product are therefore particularly advantageous. Thus, the cost of manufacturing products which require multiple parts (as in U.S. Pat. No. 6,512,581), or which require accurate placement to ensure correct alignment of different components (as in DE2923301), may be prohibitive.

There is now provided an improved paediatric cuvette, which overcomes or substantially mitigates the above mentioned and/or other problems associated with the prior art.

SUMMARY OF THE DISCLOSURE

According to a first aspect of the invention there is provided a gas sampling cell assembly comprising a cuvette and an insert, the cuvette comprising an inlet, a sampling channel, an outlet and at least one optical window and being configured such that a gas sample passes from the inlet, through the sampling channel and to the outlet, the insert comprising a unitary insert having a hub and at least two extending members extending outwardly from the hub, the at least two extending members defining a void therebetween and the insert being located, in use, at least partially within the sampling channel, and the gas sampling cell assembly being configured such that light passing through the optical window passes into the sampling channel and through the void between the two extending members.

The insert physically occupies some of the space within the cuvette, reducing the internal volume to a level which is suitable for the low tidal volume of a paediatric patient, enabling accurate $CO_2$ sampling of the expiratory air of paediatric patients.

According to a second aspect of the invention there is provided an insert for use in conjunction with a gas sampling cell, the insert comprising a unitary insert having a hub and at least two extending members extending outwardly from the hub, the at least two extending members defining a void therebetween and the insert being located, in use, at least partially within the sampling channel of a gas sampling cell.

The insert used within the gas sampling cell assembly of the invention is a unitary insert, that is, it comprises and is formed of a single unit. This single unit construction reduces the number of components involved in the product, thus reducing manufacturing cost and complexity. The insert comprises at least two extending members extending outwardly from a hub, the two extending members defining a void or aperture therebetween through which, in use, infrared light passes. Thus, the void defined by the at least two extending members is, in use, in alignment with the optical window through which infrared light is directed for sampling purposes. The size of the void or aperture may be varied to avoid occlusion of the optical window(s). In embodiments in which the void or aperture is larger than the optical window, small movements of the insert within the cuvette will not result in occlusion of the optical window(s) by the insert.

The cuvette may be a conventional adult cuvette, such as is known in the art, which typically comprises two optical windows.

The insert may be formed by injection moulding. The insert may be formed of a resilient material. The insert may be formed of a plastics material, eg a resilient plastics material. The insert maybe formed of high-density polyethylene (HDPE). The insert may be formed in a single injection moulding step.

The hub forms a point of attachment for the at least two extending members, and may be any appropriate shape. In particular, at least part of the outer walls of the hub may be shaped to correspond to at least part of the shape of the internal walls of the cuvette such that, in use, at least part of the outer wall of the hub follows the shape of the internal wall of the cuvette. The hub may be substantially cylindrical. The hub may have a cross-sectional shape that is substantially circular, square, rectangular, polygonal or oval. Where the cross-sectional shape of the hub is substantially square, rectangular or polygonal, one or more of the sides of the cross-sectional shape may be arcuate. For example, two opposing sides of the cross-sectional shape of a hub having a rectangular cross-section may be arcuate. Alternatively, all of the sides of the cross-sectional shape may be arcuate. The presence of one or more arcuate sides may enable the hub to fit more closely against the internal walls of the cuvette.

The hub may be hollow. The hub may be tubular. The hub may comprise an aperture or lumen extending through it, to permit the passage of respiratory gasses. Respiratory gases may pass through an aperture in the hub, or through a lumen in the hub, and subsequently pass into and through the void or aperture formed between the at least two extending members.

The at least two extending members extend outwardly from the hub, and define a void or aperture therebetween. The void formed between the at least two extending members may be elongate in shape. The at least two extending members may be connected together at the end proximal to the hub. The at least two extending members may or may not be connected together at an end distal to the hub. The void formed between the at least two extending members may be open-ended, eg the at least two extending members may extend outwardly from the hub, and may only be connected together via the hub (they may not be connected together at an end distal to the hub). In this embodiment, the elongate and open-ended nature of the void means that small longitudinal movements of the insert within the cuvette will not result in occlusion of the optical window by the insert, such as may occur with a shortened or circular aperture. The void formed between the at least two extending members may be close-ended, that is, it may comprise an aperture formed by the further connection of the at least two extending members at a point distal to the hub eg the two extending members may be connected by a connecting member. Such an aperture may be circular, ovaline, elongate, rectangular, polygonal or any other shape.

A surface of each of the at least two extending members may be curved. An outer surface may be curved to follow the internal wall of the cuvette. An inner surface of each of the at least two extending members may comprise a substantially straight or planar section at the end distal to the hub, and a curved or arcuate section at the end proximal to the hub, such that the proximal end of an inner surface of each extending member is curved or arcuate. At least a portion of an inner surface of each of two extending members, in particular a portion of the inner surface at the proximal end of each of two extending members, may comprise an arcuate shape, the arcuate shapes of the proximal ends of two extending members being connected together such that they form a continuous curve. Thus, a continuous wall may extend from the distal end of one extending member to the distal end of a second extending member, through an intermediate arcuate portion, eg forming a "U" shape.

The at least two extending members may extend outwardly from the hub in substantially the same direction. The at least two extending members may be substantially parallel. The at least two extending members may extend outwardly from the hub with an angle therebetween of between 0° and 5°, or with an angle therebetween of greater than 0° and less than 5°.

At least two of the at least two extending members may comprise clipping means at or near the end distal to the hub. The clipping means may comprise a nub, shoulder or projection extending outwardly from the distal end of the extending member. The clipping means may extend radially outwardly from the distal end of the extending member. The clipping means may increase the diameter of the insert at the point at the distal end of the extending member, such that the distance between the outer walls of two opposing extending members is greater at the distal end than at the proximal end. In a cuvette, the internal diameter in the gas sampling channel is typically smaller than the internal diameter in either the inlet or the outlet. There may thus be a first shoulder formed where the internal diameter decreases between the inlet and the gas sampling channel, and a second shoulder formed where the internal diameter increases between the gas sampling channel and the outlet. The diameter of the hub and/or the distance between an outer surface of one extending member and an outer surface of an opposing extending member may be substantially the same or slightly smaller than the internal diameter of the gas sampling channel of the cuvette. The increased diameter of the clipping means is such that the diameter of the insert at this point is larger than the internal diameter of the gas sampling channel, but the same as or smaller than the internal diameter of the inlet and/or outlet. When the insert is inserted into a cuvette, the pressure of the internal walls of the gas sampling channel against the clipping means causes the extending members to flex inwardly, that is, to flex towards each other, in order to reduce the diameter of the insert sufficiently to fit through the gas sampling channel. Once the clipping means have passed through the gas sampling channel, the outward bias of the extending members causes the extending members to return to their original position, the clipping means then being accommodated within the inlet or outlet of the cuvette. In this configuration, the clipping mean(s) may abut the first or second shoulder of the cuvette, such that they cannot easily be moved in the reverse direction, fixing the insert in place within the cuvette. Thus, the insert may fit into the cuvette with a snap-fit, which provides tactile feedback to reassure the user that it has been correctly inserted, and prevents unintentional disconnection of the insert from the cuvette.

The hub may further comprise one or more projections, extending outwardly from the hub. The one or more projections may comprise an annular ring or collar, and/or one or more protrusions. For example, the hub may comprise two protrusions extending from opposing sides of the hub, or a plurality of protrusions spaced about the outer circumference of the hub. The hub may alternatively or additionally comprise an annular ring or collar extending radially outwardly from the hub. Such an annular ring or collar may extend continuously around the hub, or may be discontinuous, and be formed in two or more parts. The annular ring or collar may be shaped such that the shape of at least part of its outer edge corresponds to the shape of the internal wall of the cuvette. The one or more projections may be positioned proximate to the at least two extending members. When inserted into the cuvette, at least one of the one or more projections may abut the first or second shoulder within the cuvette, preventing over-insertion of the insert into the cuvette and ensuring easy and accurate placement of the insert into the cuvette.

The sampling channel and insert may be shaped to prevent rotation of the insert within the sampling channel. In particular, the sampling channel and/or at least a portion of the insert, eg the hub or at least a portion of the hub, may comprise a non-circular cross-section, to prevent rotation of the insert within the sampling channel. The sampling channel and at least a portion of the insert may comprise complementary cross-sectional shapes, such that they nest together. The sampling channel and/or at least a portion of the insert (eg the hub or at least a portion of the hub) may comprise a cross-sectional shape which is substantially oval, polygonal, rectangular, square or triangular, and any or all sides of any such cross-sectional shape may extend in an arcuate shape between two vertices.

Each of the extending members may comprise clipping means as previously described, and the insert may comprise an annular ring or one or more projections, as previously described. Thus, when the insert is inserted into a cuvette, the insert may be prevented from over insertion by contact of the annular ring or one or more projections with an internal shoulder of the cuvette, and be prevented from unintentional removal from the cuvette by the abutment of the clipping means against a second internal shoulder of the cuvette.

The size of the insert may vary. For example, the overall size of the insert, and/or the thickness of the walls of the insert may be altered depending on the desired final internal volume of the gas sampling assembly. Colour or pattern may be used to denote inserts of different sizes, eg inserts may be different colours, or carry different surface patterns, with each colour or pattern denoting a particular size or volume. This enables a user to quickly and accurately select the appropriate insert or gas sampling cell assembly from a selection available.

The insert may occupy from 1% to 90% of the internal volume of the cuvette. The insert may occupy from 1% to 50%, or from 1% to 40%, or from 5% to 35%, or from 10% to 30%, or from 15% to 25% of the internal volume of the cuvette, reducing the internal volume of the cuvette to a level suitable for the analysis of respiratory gas from patients with a low tidal volume. It has been found that the internal volume of the cuvette may be reduced to this degree without affecting the function of the cuvette, or of the respiratory circuit.

The insert may be supplied on its own. The simple insertion of the insert into an existing adult cuvette means that separately supplied inserts may be inserted into existing cuvettes by a user at the appropriate time, reducing the number of articles that need to be stocked in any single setting.

The insert may be supplied already inserted into the cuvette, so that the medical practitioner can quickly and easily join up the gas sampling cell assembly of the invention to existing respiratory equipment.

The insert (or multiple inserts of different sizes) may alternatively be supplied in a kit with a cuvette, so that the cuvette may be used either in conjunction with an insert or separately from it. According to a further aspect of the invention there is therefore provided a kit of parts comprising a cuvette and at least one insert, the cuvette comprising an inlet, a sampling channel, an outlet and at least one optical window and being configured such that a gas sample passes from the inlet, through the sampling channel and to the outlet, and the at least one insert comprising a unitary insert having a hub and at least two extending members extending outwardly from the hub, the at least two extending members defining a void or aperture therebetween and the insert being insertable into the cuvette such that it is located, in use, at least partially within the sampling channel and configured such that light passing through the optical window passes into the sampling channel and through the void or aperture between the two extending members.

BRIEF DESCRIPTION OF THE DRAWINGS

The invention will now be described in more detail, by way of example only, with reference to the following Figures.

DETAILED DESCRIPTION

Figure 1:
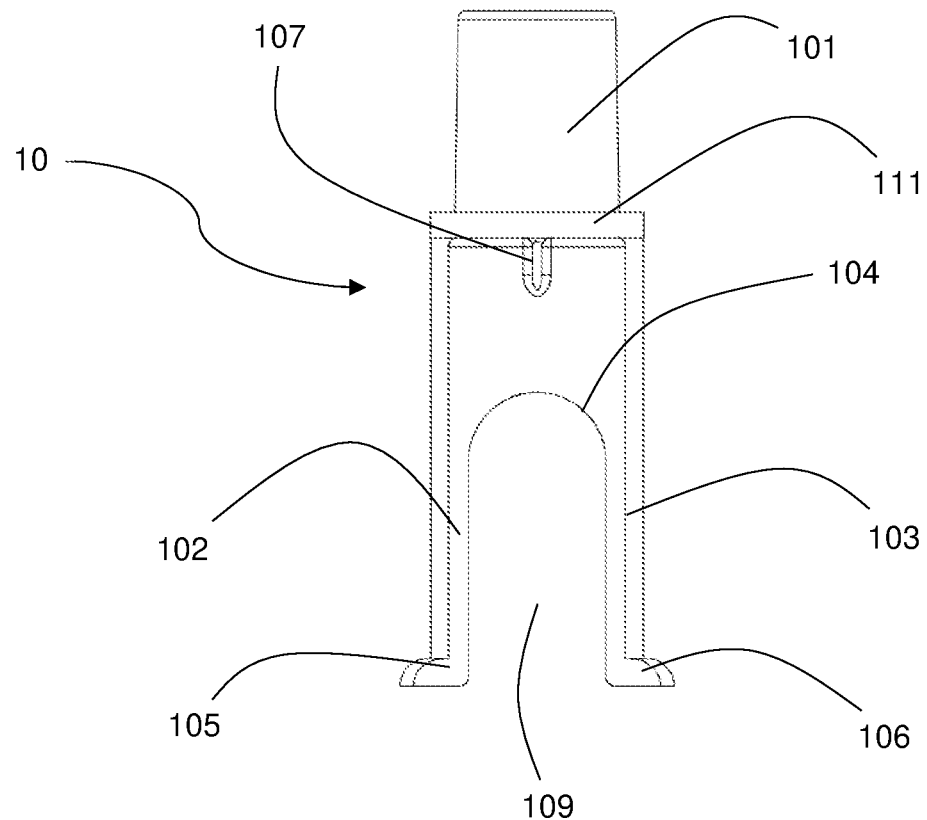
FIG. 1 is a front view of an embodiment of the insert according to the invention.

An insert 10 according to the invention can be seen in FIG. 1. The insert comprises a hub 101 from which two extending members 102, 103 protrude downwardly, forming a void 109 therebetween. The two extending members each comprise an arcuate inner edge 104 at the end proximal to the hub. The two extending members are connected together at the proximal end such that they form a continuous curve. The continuous curve forms an intermediate portion of a continuous wall extending from the distal end of one extending member to the distal end of a second extending member, forming a 'U' shape along their internal edge 104. Each of the two extending members 102, 103 comprises a nub 105, 106 at the end of the extending member 102, 103 distal to the hub. The nub 105, 106 extends outwardly from the distal ends of the extending members 102, 103.

The hub 101 comprises a first protrusion 107 and a second protrusion (108; see FIG. 2), the two protrusions extending outwardly from the hub on opposing sides and forming shoulders for engagement with the cuvette (not shown). The hub additionally comprises an annular ring or collar 111 which extends radially outwardly from at least a portion of the hub 101, the outer edge of the annular ring or collar 111 being shaped to correspond to the shape of an internal wall of the cuvette (not shown). The annular ring or collar 111 is positioned directly above the first and second protrusions 107, 108. At least a portion of the hub 101 is tubular, and substantially cylindrical in shape, with the shape of the outer wall of the hub corresponding to the shape of the internal wall of the cuvette into which it is to be inserted.

The insert 10 has been injection moulded in a single step, and is formed from a unitary piece of plastics material.

Figure 2:
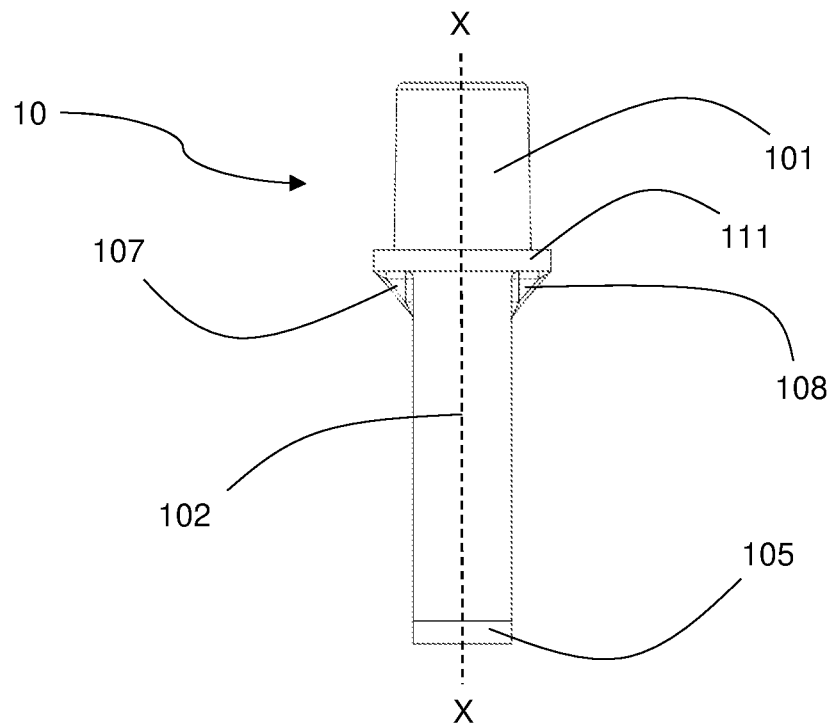
FIG. 2 is a side view of the insert of FIG. 1.

A side view of the insert can be seen in FIG. 2, in which the two protrusions 107, 108 extending outwardly from opposing sides of the hub 101 are visible.

Figure 3:
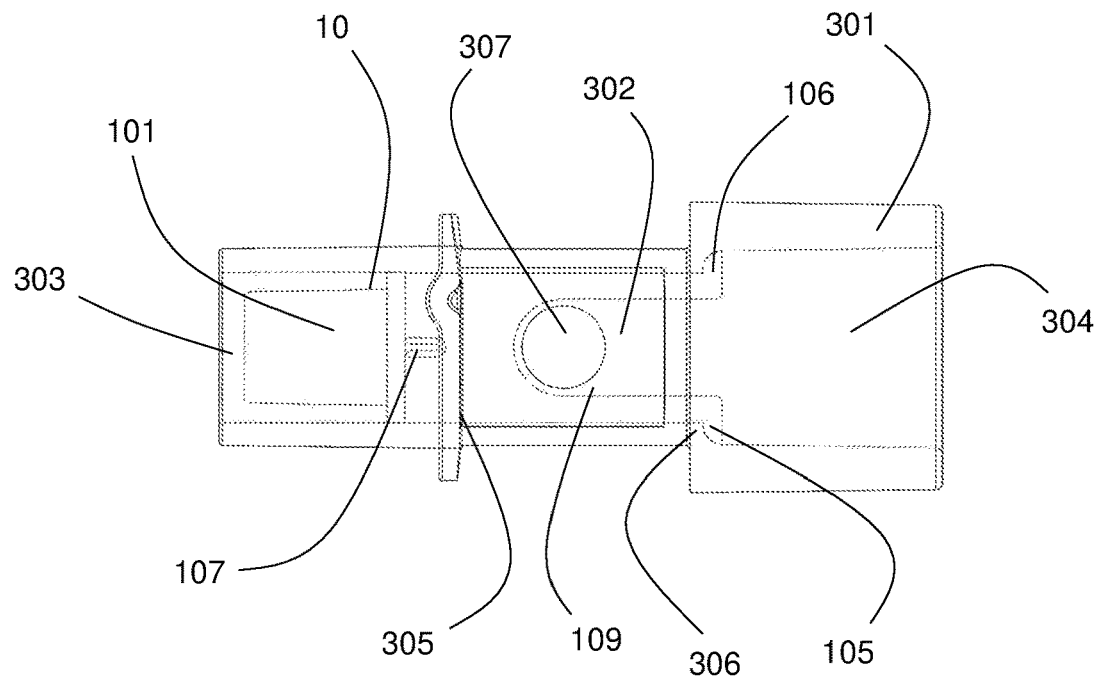
FIG. 3 is the insert of FIG. 1 or 2 retained within a cuvette.

The insert 10, when inserted within a cuvette 301, can be seen in FIG. 3. The cuvette is shaped such that the internal diameter of the cuvette in the gas sampling channel 302 is smaller than the internal diameter of the cuvette in either the inlet 303 or the outlet 304. Within the cuvette, a first shoulder 305 is present where the internal diameter changes between the inlet 303 and the gas sampling channel 302, and a second shoulder 306 is present where the internal diameter changes between the gas sampling channel 302 and the outlet 304. The first and second protrusions 107, 108 on the hub 101 of the insert 10 abut the first shoulder 305, while the nubs 105, 106 abut the second shoulder 306, securely holding the insert 10 in position within the cuvette 301.

During insertion of the insert 10 into the cuvette 301, pressure from the internal walls of the cuvette 301 causes the two extending members 102, 103 to flex inwardly, enabling them to pass through the narrower gas sampling channel 302. Once the nubs 105, 106 on the two extending members 102, 103 have passed through the gas sampling channel 302 and into the wider outlet 304, the two extending members 102, 103 return to their original positions, causing the nubs 105, 106 to hook around and abut the second shoulder 306. Thus, the insert 10 is prevented from further insertion into the cuvette 301 by the abutment of the protrusions 107, 108 against the first shoulder 305, and is prevented from return movement by the abutment of the nubs 105, 106 against the second shoulder 306, effectively retaining the insert 10 in place within the cuvette 301.

The cuvette further comprises two opposing optical windows 307 through which infrared light is passed in order to measure $CO_2$ levels in respiratory gases. The optical window 307 is aligned with the void 109 formed between the two extending members 102, 103. Thus, the insert 10 does not prevent the passage of infrared light through the cuvette 301, and the elongate shape of the void 109 means that small longitudinal movements of the insert 10 within the cuvette 301 will not lead to occlusion of the optical window 307 by the insert 10.

Figure 4:
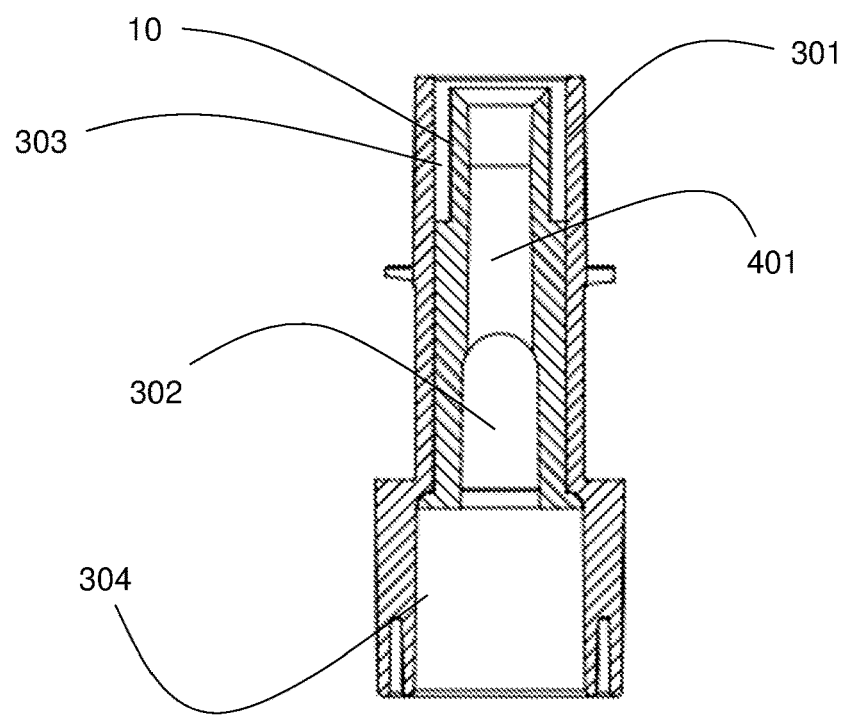
FIG. 4 is a cross-sectional view of the insert of FIG. 1 or 2 inside a cuvette, with the cross-section taken along the line X-X as shown in FIG. 2.

A cross-section of the insert 10 and cuvette 301 is shown in FIG. 4, with the cross-section taken along the line indicated X-X in FIG. 2. In addition to the features previously discussed, this view shows the interior of the hub 101. The interior of the hub 101 comprises a lumen 401 through which respiratory gases can pass, allowing incoming respiratory gases to pass from the inlet 303, through the gas sampling channel 302 and to the outlet 304. This lumen 401 has a smaller diameter compared to the internal diameter of the cuvette inlet 303 and gas sampling channel 302, making it more suitable for the transfer of the low volumes of respiratory gases seen in paediatric patients.

What is claimed:

1. A kit of parts comprising a cuvette and a unitary insert, the cuvette comprising an inlet, a gas sampling channel, an outlet and at least one optical window and being configured such that a gas sample passes from the inlet, through the sampling channel and to the outlet, the unitary insert comprising a hub and at least two extending members extending outwardly from the hub, the at least two extending members defining a void therebetween, and being insertable into the cuvette such that it is located, in use, at least partially within the gas sampling channel and configured such that light passing through the optical window passes into the sampling channel and through the void between the two extending members.

2. The kit of parts of claim 1, wherein the insert is formed of a resilient material.

3. The kit of parts of claim 1, wherein the hub has a cross-sectional shape which is substantially circular, square, rectangular, polygonal or oval.

4. The kit of parts of claim 3, wherein one or more of the sides of the cross-sectional shape are arcuate.

5. The kit of parts of claim 1, wherein the hub comprises an aperture through which, in use, respiratory gases pass.

6. The kit of parts of claim 1, wherein the at least two extending members are not connected together at an end distal to the hub.

7. The kit of parts of claim 1, wherein an inner surface of each of the at least two extending members comprises a substantially straight or planar section at the end distal to the hub, and a curved or arcuate section at the end proximal to the hub.

8. The kit of parts of claim 7, wherein the arcuate shapes of the proximal ends of two extending members are connected together such that they form a continuous curve.

9. The kit of parts of claim 1, wherein the at least two extending members are substantially parallel.

10. The kit of parts of claim 1, wherein at least one of the at least two extending members comprise clipping means at or near the end distal to the hub.

11. The kit of parts of claim 10, wherein the clipping means comprise a nub extending radially outwardly from the distal end of the extending member.

12. The kit of parts of claim 1, wherein the hub further comprises one or more projections extending outwardly from the hub.

13. The kit of parts of claim 12, wherein the one or more projections comprise an annular collar.

14. The kit of parts of claim 13, wherein the one or more projections comprise at least two protrusions extending outwardly from opposing sides of the insert.

15. A gas sampling cell assembly comprising a cuvette and an insert, the cuvette comprising an inlet, a gas sampling channel, an outlet, and at least one optical window, wherein the cuvette is configured such that a gas sample passes from the inlet, through the gas sampling channel and to the outlet, and the insert comprises a unitary insert comprising a hub and at least two extending members extending outwardly from the hub, the at least two extending members defining a void therebetween, and the unitary insert being located, in use, at least partially within the gas sampling channel.

16. The gas sampling cell assembly of claim 15, wherein the insert occupies from 1% to 50% of the internal volume of the cuvette.

17. The gas sampling cell assembly of claim 15, wherein the cuvette comprises two optical windows.

18. The gas sampling cell assembly of claim 15, wherein at least a portion of the outer walls of the hub are shaped to correspond to at least a portion of the shape of internal walls of the gas sampling cell.

* * * * *